(12) United States Patent
Sakazaki et al.

(10) Patent No.: US 8,673,417 B2
(45) Date of Patent: Mar. 18, 2014

(54) HOSE FOR GASOHOL FUEL

(75) Inventors: Kazushige Sakazaki, Komaki (JP);
Hiroyoshi Mori, Iwakura (JP);
Kazutaka Katayama, Komaki (JP);
Shinji Iio, Komaki (JP); Hidehito Ikeda, Kazugai (JP); Hideji Fukaya, Nissin (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 365 days.

(21) Appl. No.: 12/054,075

(22) Filed: Mar. 24, 2008

(65) Prior Publication Data
US 2008/0230137 A1 Sep. 25, 2008

(30) Foreign Application Priority Data

Mar. 23, 2007 (JP) .................. 2007-077315
Mar. 23, 2007 (JP) .................. 2007-077316
Mar. 23, 2007 (JP) .................. 2007-077317
Jan. 17, 2008 (JP) .................. 2008-008219
Jan. 17, 2008 (JP) .................. 2008-008220
Jan. 17, 2008 (JP) .................. 2008-008221
Jan. 17, 2008 (JP) .................. 2008-008222

(51) Int. Cl.
*B32B 1/08* (2006.01)
*B32B 25/08* (2006.01)
*B32B 25/18* (2006.01)
*B32B 27/30* (2006.01)

(52) U.S. Cl.
USPC ...................... 428/36.9; 428/36.91

(58) Field of Classification Search
USPC ........................... 428/36.91, 36.9
See application file for complete search history.

(56) References Cited

U.S. PATENT DOCUMENTS

| | | | | |
|---|---|---|---|---|
| 4,830,920 A | * | 5/1989 | Hayashi et al. | 428/421 |
| 5,374,484 A | * | 12/1994 | Kasahara et al. | 428/421 |
| 5,588,469 A | | 12/1996 | Kakiuchi et al. | |
| 5,941,286 A | * | 8/1999 | Fauble et al. | 138/137 |
| 6,106,914 A | * | 8/2000 | Kanbe et al. | 428/36.91 |
| 6,303,699 B1 | * | 10/2001 | Naraki et al. | 525/326.3 |
| 6,467,509 B1 | * | 10/2002 | Iio et al. | 138/137 |
| 6,682,796 B2 | * | 1/2004 | Ito et al. | 428/36.91 |
| 6,723,400 B1 | * | 4/2004 | Ishio et al. | 428/35.7 |

(Continued)

FOREIGN PATENT DOCUMENTS

EP  1 096 190 A1  5/2001
EP  1 101 994 A2  5/2001

(Continued)

OTHER PUBLICATIONS

Lange's Handbook of Chemistry, ed. Speight, James G., McGraw-Hill, 2005.*

(Continued)

*Primary Examiner* — Michele L Jacobson
(74) *Attorney, Agent, or Firm* — Westerman, Hattori, Daniels & Adrian, LLP

(57) ABSTRACT

A hose for gasohol fuel including an inner layer containing at least one selected from (A) to (D) below and an alcohol-cut off layer including a rubber composition containing a butyl rubber, a hydrated hydrotalcite compound, and a 1,8-diazabicyclo(5,4,0)undecene-7 salt (DBU salt):

(A) a tetrafluoroethylene-hexafluoropropylene-vinylidene fluoride terpolymer or a tetrafluoroethylene-hexafluoropropylene-vinylidene fluoride-perfluoroalkyl vinyl ether tetrapolymer;
(B) a polyamide resin;
(C) a fluororubber; and
(D) NBR or NBR-PVC.

9 Claims, 3 Drawing Sheets

(56) References Cited

U.S. PATENT DOCUMENTS

| | | | |
|---|---|---|---|
| 6,737,480 B2 * | 5/2004 | Ikeda et al. | 525/345 |
| 6,841,215 B2 * | 1/2005 | Kitamura et al. | 428/36.9 |
| 7,431,991 B2 * | 10/2008 | Verschuere et al. | 428/422 |
| 2002/0006491 A1 * | 1/2002 | Ito et al. | 428/36.91 |
| 2003/0100677 A1 * | 5/2003 | Kitamura et al. | 525/109 |
| 2004/0142135 A1 * | 7/2004 | Verschuere et al. | 428/36.91 |
| 2004/0214916 A1 * | 10/2004 | Patel et al. | 523/122 |
| 2005/0003126 A1 | 1/2005 | Ito et al. | |
| 2005/0147828 A1 * | 7/2005 | Verschuere et al. | 428/422 |
| 2005/0208248 A1 * | 9/2005 | Ilo et al. | 428/36.91 |
| 2006/0042712 A1 * | 3/2006 | Iio et al. | 138/137 |
| 2006/0128857 A1 * | 6/2006 | Otaka et al. | 524/322 |
| 2006/0216518 A1 | 9/2006 | Funayama et al. | |
| 2007/0231522 A1 * | 10/2007 | Sakazaki et al. | 428/36.91 |

FOREIGN PATENT DOCUMENTS

| | | |
|---|---|---|
| EP | 1 160 496 A1 | 12/2001 |
| EP | 1 704 994 A1 | 9/2006 |
| JP | 5-117478 A | 5/1993 |
| JP | 62-21190 B2 | 3/1994 |
| JP | 09-085898 A | 3/1997 |
| JP | 10-504369 A | 4/1998 |
| JP | 2004-042495 A | 2/2004 |
| JP | 2004-301171 A | 10/2004 |
| JP | 2005-187584 A | 7/2005 |
| JP | 2005-522639 A | 7/2005 |
| JP | 2006-266317 A | 10/2006 |
| JP | 2006-306053 A | 11/2006 |
| JP | 2007-223172 A | 9/2007 |
| JP | 2008-001810 A | 1/2008 |
| WO | 96/21820 A1 | 7/1996 |
| WO | 03/086756 A1 | 10/2003 |
| WO | 03-086756 A1 | 10/2003 |

OTHER PUBLICATIONS

European Search Report dated Aug. 4, 2008; Application No. 08005347.3-2124.

Japanese Office Action dated Apr. 3, 2012 issued in corresponding Japanese Patent Application No. 2008-008220 (With English Translation, 4 pages).

Decision to Grant a Patent dated May 21, 2013, issued in corresponding Japanese Patent Application No. 2008-008222, with English translation (6 pages).

Japanese Office Action dated Jun. 26, 2012, issued in corresponding Japanese Patent Applicatuon No. 2008-008222, with English translation (6 pages).

Partial english translation only of JP09-085898, previously submitted on Feb. 6, 2012.

Full english translation only of JP2004-042495, previously submitted on Feb. 6, 2012.

Japanese Office Action dated Dec. 6, 2011, issued in corresponding Japanese Patent Application No. 2008-008221.

Decision to Grant a Patent dated Dec. 6, 2011, issued in corresponding Japanese Patent Application No. 2008-008219.

* cited by examiner

HOSE FOR GASOHOL FUEL

BACKGROUND OF THE INVENTION

1. Field of the Invention

The present invention relates to a hose for gasohol fuel for use in piping for transporting alcohol-blended gasoline (gasohol) and the like.

2. Description of the Related Art

In recent years, regulations on fuel gas transpiration surrounding automobiles are becoming severer, and it is required to drastically reduce transpiration of fuels from fuel-system hoses. In response, various low-permeability fuel hoses for automobiles are being studied. As one of such fuel-system hoses, a fuel filler hose for transporting volatile hydrocarbons has been proposed (for example, PCT Japanese Translation Patent Publication No. 2005-522639). This fuel filler hose includes (a) a relatively thin inner layer of an FKM fluoropolymer in an elastomer form, (b) one or more further relatively thin intermediate layers which are thermoplastic molded products prepared by extrusion-molding a THV fluoropolymer into a tubular shape over the inner FKM layer, the intermediate THV layer being integral with the FKM inner layer and having a sufficient thickness to present a substantial barrier for preventing leakage of volatile hydrocarbons, and (c) a durable outer layer of an elastomer polymer bonded to the outer surface of the intermediate layer and being coextensive with the outer surface of the intermediate layer.

Since the fuel filler hose disclosed in the above-described patent document is aimed to be used for transporting volatile hydrocarbons, it satisfies the permeation resistance to the hydrocarbon vapor as far as gasoline being mixed with no alcohol is concerned. However, its permeation resistance is insufficient to alcohol-blended gasoline (gasohol) fuel containing alcohol having high permeability, such as ethanol.

SUMMARY OF THE INVENTION

The present invention has been made under the above-described circumstances. Accordingly, it is an object of the present invention to provide a hose for gasohol fuel having excellent resistance to permeation of alcohol fuels.

To achieve the above-described object, a hose for gasohol fuel according to the present invention includes a tubular inner layer and an alcohol-cut off layer formed at the outer periphery of the inner layer, in which the inner layer includes a composition containing at least one selected from the group consisting of (A), (B), (C), and (D) below and the alcohol-cut off layer includes a rubber composition containing a butyl rubber, a hydrated hydrotalcite compound, and a 1,8-diazabicyclo(5,4,0)undecene-7 salt (DBU salt):

(A) a tetrafluoroethylene-hexafluoropropylene-vinylidene fluoride terpolymer or a tetrafluoroethylene-hexafluoropropylene-vinylidene fluoride-perfluoroalkyl vinyl ether tetrapolymer;
(B) a polyamide resin;
(C) a fluororubber; and
(D) an acrylonitrile-butadiene rubber or a blend material of an acrylonitrile-butadiene rubber and polyvinyl chloride.

In other words, the present inventors have conducted extensive studies to obtain a hose, for gasohol fuel, having high resistance to permeation of alcohol fuel. It has been a common technical knowledge not to use butyl rubber for fuel hoses because of its poor resistance to hydrocarbon fuel oil and poor resistance to fuel permeation. However, the present inventors have focused attention on butyl rubber and continued experiments. As a result, it has been found that butyl rubber has excellent resistance to permeation of alcohol fuel. Moreover, it has been found that when the alcohol-cut off layer is composed of a rubber composition containing a hydrated hydrotalcite compound and 1,8-diazabicyclo(5,4,0) undecene-7 salt (OBU salt), interlayer adhesion between the alcohol-cut off layer and the layer contacting therewith improves due to a synergetic effect of the acid accepting effect of the hydrated hydrotalcite compound and the vulcanization accelerating effect of the DBU salt. Thus, the inventors have arrived at the present invention.

As described above, the hose for gasohol fuel according to the present invention includes a tubular inner layer and an alcohol-cut off layer formed on the outer periphery of the inner layer, the inner layer being composed of a composition containing at least one selected from the group consisting of (A) to (D) described above, the alcohol-cut off layer being composed of a rubber composition containing butyl rubber. Of the vapor of fuel that flows while making contact with the tubular inner layer, the hydrocarbon vapor can be substantially completely prevented from permeation and the alcohol vapor can be considerably suppressed from permeation. Partly permeated alcohol is completely suppressed from permeation by the alcohol-cut off layer composed of the rubber composition containing butyl rubber. Although the butyl rubber lacks resistance to hydrocarbon fuel oil, hydrocarbon fuel vapor is blocked by the inner layer in this case so that the butyl rubber suffers no influence from the hydrocarbon fuel oil. Accordingly, the hose for gasohol fuel according to the present invention has excellent resistance to permeation of alcohol-blended gasoline (gasohol). Since the alcohol-cut off layer is composed of a rubber composition containing the hydrated hydrotalcite compound and the 1,8-diazabicyclo(5,4,0)undecene-7 salt (DBU salt), interlayer adhesion between the alcohol-cut off layer and the layer contacting therewith improves due to a synergetic effect of the acid accepting effect of the hydrated hydrotalcite compound and the vulcanization accelerating effect of the DBU salt.

The hose for gasohol fuel having the inner layer composed of a composition containing at least one selected from the group consisting of (A) to (D) described above has excellent resistance to fuel oil.

DESCRIPTION OF THE PREFERRED EMBODIMENTS

In the embodiments of the present invention, depending on the material used for forming the inner layer, the hose for gasohol fuel may be categorized into the following four types.

[Hose of First Embodiment]

A hose having an inner layer composed of a composition containing the following (A):

(A) a tetrafluoroethylene-hexafluoropropylene-vinylidene fluoride terpolymer or a tetrafluoroethylene-hexafluoropropylene-vinylidene fluoride-perfluoroalkyl vinyl ether tetrapolymer.

[Hose of Second Embodiment]

A hose having an inner layer composed of a composition containing the following (B):
(B) a polyamide resin.

[Hose of Third Embodiment]

A hose having an inner layer composed of a composition containing the following (C):
(C) a fluororubber.

[Hose of Fourth Embodiment]

A hose having an inner layer composed of a composition containing the following (D):
(D) an acrylonitrile-butadiene rubber or a blend material of an acrylonitrile-butadiene rubber and polyvinyl chloride.

Each of the embodiments of the present invention will now be described in detail.

[First Embodiment]

Figure 1:
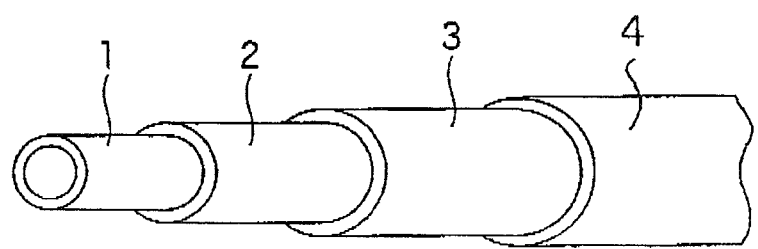
FIG. 1 is a schematic diagram showing one example of a hose for gasohol fuel according to the first and second embodiments of the present invention.

An example of the hose for gasohol fuel of the first embodiment according to the present invention is a hose having a four-layer structure shown in FIG. 1, in which an inner layer 2, an intermediate layer 3, and an alcohol-cut off layer (outer layer) 4 are sequentially formed on the outer peripheral surface of a tubular innermost layer 1. It should be noted that the hose for gasohol fuel (hose of the first embodiment) of the present invention is not limited to one having the four-layer structure shown in FIG. 1. Any hose in which the alcohol-cut off layer 4 is formed on the outer periphery of the inner layer 2 is satisfactory. Furthermore, another layer may be formed on the outer periphery of the alcohol-cut off layer 4.

The hose of the first embodiment according to the present invention is characterized in that the inner layer 2 is composed of a composition containing a tetrafluoroethylene-hexafluoropropylene-vinylidene fluoride terpolymer or a tetrafluoroethylene-hexafluoropropylene-vinylidene fluoride-perfluoroalkyl vinyl ether tetrapolymer, and that the alcohol-cut off layer 4 is composed of a rubber composition containing butyl rubber, a hydrated hydrotalcite compound, and a 1,8-diazabicyclo(5,4,0)undecene-7 salt (DBU salt).

In the present invention, alcohol-blended gasoline (gasohol) fuel means fuel containing several to 100 percent of alcohol. Gasohol fuel, in general, exhibits a highest permeability when the alcohol content is 10% to 20%, Examples of such alcohol are ethanol and methanol. It is ethanol that is typically used in the present invention.

An example of the rubber component of the rubber composition used to form the innermost layer 1 (the material for the innermost layer) is a blend rubber (NBR-PVC) of acrylonitrile-butadiene rubber (NBR) and polyvinyl chloride (PVC) or NBR alone.

The rubber component (NBR-PVC or NBR alone) content is typically not less than 40 percent by weight of the total of the material (rubber composition) of the innermost layer.

Examples of NBR include those having a medium-high acrylonitrile content (AN content), a high AN content, and an ultrahigh AN content. From the standpoint of resistance to fuel oil, one having an AN content in the range of 25 to 60 percent is preferred, and one having an AN content in the range of 30 to 55 percent is more preferred. NBR having an ultrahigh AN content is advantageous in that resistance to gasoline permeation is improved and thus resistance to gasoline and resistance to ozone are improved. NBR of a medium-high AN content is slightly inferior to the NBR of an ultrahigh AN content, but is advantageous in that resistance to gasoline permeation is improved.

The blend ratio (weight ratio) of NBR to PVC in the above-described NBR-PVC is preferably in the range of NBR/PVC=90/10 to 40/60, and more preferably in the range of NBR/PVC=80/20 to 50/50.

The above-described material for forming the innermost layer may be prepared by adding carbon black, an antioxidant, a vulcanizing agent (cross-linking agent), a vulcanization accelerator (cross-linking accelerator), a vulcanization aid (cross-linking aid), a processing aid, a white filler, a plasticizer, a softener, an acid acceptor, a coloring agent, a scorch retarder, and other suitable additives, in addition to the rubber component described above.

As the material (resin composition) for forming the inner layer 2, a particular thermoplastic fluorocarbon resin composed of a tetrafluoroethylene (TFE)-hexafluoropropylene (HFP)-vinylidene fluoride (VDF) terpolymer or a tetrafluoroethylene-hexafluoropropylene-vinylidene fluoride-perfluoroalkyl vinyl ether tetrapolymer is used.

The particular thermoplastic fluorocarbon resin content is typically not less than 50 percent by weight of the total of the material (resin composition) forming the inner layer. The material for the inner layer may be composed of the particular thermoplastic fluorocarbon resin alone.

To the material for the inner layer, a conducting agent, a plasticizer, a pigment, and the like may be added in addition to the particular thermoplastic fluorocarbon resin as long as the object of the present invention is not impaired.

As the rubber component of the rubber composition that forms the intermediate layer 3 (material for the intermediate layer), a blend rubber (NBR-PVC) of acrylonitrile-butadiene rubber (NBR) and polyvinyl chloride (PVC) or NBR alone is used, for example.

The rubber component content (NBR-PVC or NBR alone) is typically not less than 40 percent by weight of the total of the material (rubber composition) for the intermediate layer.

Examples of NBR include those having a medium-high AN content, a high AN content, and an ultrahigh AN content. From the standpoint of resistance to fuel oil, NBR having an AN content in the range of 25 to 60 percent is preferred, and NBR having an AN content in the range of 30 to 55 percent is more preferred. NBR having an ultrahigh AN content is advantageous in that resistance to gasoline permeation is improved and thus resistance to gasoline and resistance to ozone are improved. Although NBR with a medium-high An content is slightly inferior to the NBR with an ultrahigh An content, it is advantageous in that resistance to gasoline permeation is improved.

The blend ratio (weight ratio) of NBR to PVC in the above-described NBR-PVC is preferably in the range of NBR/PVC=90/10 to 40/60, and more preferably in the range of NBR/PVC=80/20 to 50/50.

To the above-described material for the intermediate layer, carbon black, an antioxidant, a vulcanizing agent (cross-linking agent), a vulcanization accelerator (cross-linking accelerator), a vulcanization aid (cross-linking aid), a processing aid, a white filler, a plasticizer, a softener, an acid acceptor, a coloring agent, a scorch retarder, and other suitable additives may be added in addition to the rubber component described above.

As the rubber composition that forms the alcohol-cut off layer 4 (material for the alcohol-cut off layer), butyl rubber, a hydrated hydrotalcite compound, and a 1,8-diazabicyclo(5,4,0)undecene-7 salt (DBU salt) are used.

The butyl rubber may be any copolymer of isobutylene and isoprene. Examples thereof include regular butyl rubber and halogenated butyl rubber (butyl bromide rubber, butyl chloride rubber, and the like). These may be used alone or in combination of two or more.

The butyl rubber content is preferably not less than 50 percent by weight of the total of the material (rubber composition) for the alcohol-cut off layer.

Examples of the hydrated hydrotalcite compound used in combination with the butyl rubber include $Mg_{4.5}Al_2(OH)_{13}CO_3.3.5H_2O$, $Mg_{4.5}Al_2(OH)_{13}CO_3$, $Mg_4Al_2(OH)_{12}CO_3.3.5H_2O$, $Mg_6Al_2(OH)_{16}CO_3.4H_2O$, $Mg_5Al_2(OH)_{14}CO_3.4H_2O$, $Mg_3Al_2(OH)_{10}CO_3.1.7H_2O$, $Mg_3ZnAl_2(OH)_{12}CO_3.wH_2O$, and $Mg_3ZnAl_2(OH)_{12}CO_3$. These may be used alone or in combination of two or more. Specific examples of the hydrated hydrotalcite compound include DHT-4A and DHT-6 each available from Kyowa Chemical Industry Co., Ltd.

The hydrated hydrotalcite compound content relative to 100 parts by weight (simply "parts" hereinafter) of the butyl rubber is preferably in the range of 1 to 15 parts and more preferably in the range of 2 to 6 parts to obtain beneficial acid accepting effect. This is because if the amount of the hydrated hydrotalcite compound blended is excessively small, the desired acid accepting effect is not achieved and the compression set is degraded; and if the amount of the hydrated hydrotalcite compound blended is excessively large, cross-linking progresses excessively, and rubber properties etc., may be adversely affected.

Examples of the DBU salt used in combination with the butyl rubber and the hydrated hydrotalcite compound include carboxylates of DBU and phenolic resin salts of DBU. As the carboxylates of DBU, naphthoates and sorbates of DBU are preferred. These may be used alone or in combination of two or more. Among these, naphthoates of DBU (DBU naphthoate) are preferred from the standpoint of adhesion.

The DBU salt content relative to 100 parts of butyl rubber is preferably in the range of 0.1 to 3 parts and more preferably in the range of 0.3 to 1 part. If the DBU salt content is excessively small, the desired interlayer adhesion is not obtained, and if the DBU salt content is excessively large, the cross-linking progresses excessively, and the rubber properties and the like may be adversely affected.

The hose for gasohol fuel of the first embodiment can be formed as follows. First, a rubber composition (material for the innermost layer) containing NBR-PVC or NBR, a material for the inner layer mainly composed of a particular thermoplastic fluorocarbon resin, a rubber composition (material for the intermediate layer) containing NBR-PVC or NBR, and a rubber composition (material for the alcohol-cut off layer) containing butyl rubber, a hydrated hydrotalcite compound, and a 1,8-diazabicyclo(5,4,0)undecene-7 salt (DBU salt) are prepared separately. After the rubber composition (material for the innermost layer) is extrusion-molded to form the innermost layer 1, the inner layer 2 is formed by coating the outer peripheral surface of the innermost layer 1 with the material for the inner layer. Next, on the outer peripheral surface of the inner layer 2, the rubber composition (material for the intermediate layer) and the rubber composition (material for the alcohol-cut off layer) are respectively extrusion-molded (tandem method). The resulting product is cut into a predetermined length, inserted into a mandrel, and vulcanized (140° C. to 170° C.×10 to 60 minutes). After the vulcanization, the resulting product is pulled out from the mandrel. Thus made is a four-layer structure hose for gasohol fuel (refer to FIG. 1) having the inner layer 2, the intermediate layer 3, and the alcohol-cut off layer 4 sequentially formed on the outer peripheral surface of the tubular innermost layer 1.

The method for making the hose for the gasohol fuel is not limited to the method described above.

In the hose for gasohol fuel, the thickness of the innermost layer 1 is preferably in the range of 0.2 to 4 mm and more preferably in the range of 0.5 to 3 mm, the thickness of the inner layer 2 is preferably in the range of 0.01 to 0.5 mm and more preferably in the range of 0.05 to 0.3 mm, the thickness of the intermediate layer 3 is preferably in the range of 0.2 to 4 mm and more preferably in the range of 0.5 to 3 m, and the thickness of the alcohol-cut off layer 4 is preferably in the range of 0.2 to 4 mm and more preferably 0.5 to 3 mm. Also, the hose inner diameter is preferably in the range of 2 to 50 mm and more preferably in the range of 5 to 40 mm.

The hose for gasohol fuel of the first embodiment is not limited to the four-layer structure shown in FIG. 1. For example, the hose may have a two-layer structure in which the alcohol-cut off layer 4 is directly formed on the outer peripheral surface of the inner layer 2, or a three-layer structure in which the intermediate layer 3 is formed on the outer peripheral surface of the inner layer 2 and the alcohol-cut off layer 4 is formed on the outer peripheral surface of the intermediate layer 3. Also, another layer may be formed on the outer peripheral side of the alcohol-cut off layer 4. Moreover, another layer may be formed between the inner layer 2 and the innermost layer 1.

[Second Embodiment]

An example of the hose for gasohol fuel of the second embodiment according to the present invention is a hose having a four-layer structure as shown in FIG. 1, in which the inner layer 2, the intermediate layer 3, the alcohol-cut off layer (outer layer) 4 are sequentially formed on the outer peripheral surface of the tubular innermost layer 1. It should be noted that the hose for gasohol fuel of the second embodiment is not limited to such one as having the four-layer structure shown in FIG. 1 but may have any structure as far as the alcohol-cut off layer 4 is formed at the outer periphery of the tubular inner layer 2. Also, another layer may be formed at the outer peripheral side of the alcohol-cut off layer 4.

The hose of the second embodiment is characterized in that the inner layer 2 is composed of a composition containing a polyamide resin and that the alcohol-cut off layer 4 is composed of a rubber composition containing butyl rubber, a hydrated hydrotalcite compound, and a 1,8-diazabicyclo(5,4,0)undecene-7 salt (DBU salt).

A polyamide resin is used as the material (resin composition) for the inner layer for forming the inner layer 2.

Examples of the polyamide resin include aliphatic- and aromatic-based polyamide resins. Examples thereof include lactam polymers, condensates of diamines and dicarboxylic acids, polymers of amino acid, and copolymers and blends thereof. Specific examples include polyamide 6 (PA6), polyamide 66 (PA66), polyamide 11 (PA11), polyamide 12 (PA12), polyamide 610 (PA610), polyamide 612 (PA612), polyphthalamide, and a copolymer of polyamide 6 (PA6) and polyamide 66 (PA66). These may be used alone or in combination of two or more. Among these, polyamide 6 (PA6) and polyamide 11 (PA11) are preferable for their low fuel permeability.

The polyamide resin content is preferably not less than 50 percent by weight of the total of the material (resin composition) for the inner layer. The material for the inner layer may be composed of a polyamide resin alone.

To the material for the inner layer, a conducting agent, a plasticizer, a pigment, and the like may be added in addition to the polyamide resin as long as the object of the present invention is not impaired.

The same materials as those used in the first embodiment may be used respectively as the rubber composition that forms the innermost layer 1 (material for the innermost layer), the rubber composition that forms the intermediate layer 3 (material for the intermediate layer), and the rubber composition that forms the alcohol-cut off layer 4 (material for the alcohol-cut off layer).

The hose for gasohol fuel of the second embodiment can be formed as follows. First, a rubber composition (material for the innermost layer) containing NBR-PVC or NBR, a material for the inner layer containing a polyamide resin, a rubber composition (material for the intermediate layer) containing NBR-PVC or NBR, and a rubber composition (material for the alcohol-cut off layer) containing butyl rubber, a hydrated hydrotalcite compound, and a 1,8-diazabicyclo(5,4,0)undecene-7 salt (DBU salt) are prepared separately. After the rubber composition (material for the innermost layer) is extrusion-molded to form the innermost layer 1, the inner layer 2 is formed by coating the outer peripheral surface of the innermost layer 1 with the material for the inner layer. Next, on the outer peripheral surface of the inner layer 2, the rubber composition (material for the intermediate layer) and the rubber composition (material for the alcohol-cut off layer) are respectively extrusion-molded (tandem method). The resulting product is cut into a predetermined length, inserted into a mandrel, and vulcanized (140° C. to 170° C.×10 to 60 minutes). After the vulcanization, the resulting product is pulled out from the mandrel. Thus made is a four-layer structure hose for gasohol fuel (refer to FIG. 1) having the inner layer 2, the intermediate layer 3, and the alcohol-cut off layer 4 sequentially formed on the outer peripheral surface of the tubular innermost layer 1.

The method for making the hose for the gasohol fuel of the second embodiment is not limited to the method described above.

In the hose for gasohol fuel of the second embodiment, the thickness of the innermost layer 1 is preferably in the range of 0.2 to 4 mm and more preferably in the range of 0.5 to 3 mm, the thickness of the inner layer 2 is preferably in the range of 0.01 to 0.5 mm and more preferably in the range of 0.05 to 0.3 mm, the thickness of the intermediate layer 3 is preferably in the range of 0.2 to 4 mm and more preferably in the range of 0.5 to 3 mm, and the thickness of the alcohol-cut off layer 4 is preferably in the range of 0.2 to 4 mm and more preferably in the range of 0.5 to 3 mm. Also, the hose inner diameter is preferably in the range of 2 to 50 mm and more preferably in the range of 5 to 40 mm.

The hose for gasohol fuel of the second embodiment is not limited to the four-layer structure shown in FIG. 1. For example, the hose may have a two-layer structure in which the alcohol-cut off layer 4 is directly formed on the outer peripheral surface of the inner layer 2, or a three-layer structure in which the intermediate layer 3 is formed on the outer peripheral surface of the inner layer 2 and the alcohol-cut off layer 4 is formed on the outer peripheral surface of the intermediate layer 3. Also, another layer may be formed on the outer peripheral side of the alcohol cut off layer 4. Moreover, another layer may be formed between the inner layer 2 and the innermost layer 1.

[Third Embodiment]

Figure 2:
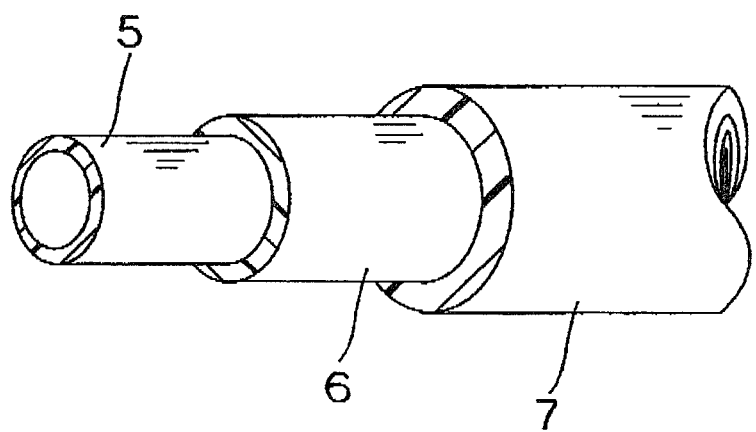
FIG. 2 is a schematic diagram showing an example of a hose for gasohol fuel according to the third embodiment of the present invention.

An example of the hose for gasohol fuel of the third embodiment according to the present invention is a hose having a three-layer structure as shown in FIG. 2, in which an intermediate layer 6 and an alcohol-cut off layer (outer layer) 7 are sequentially formed on the outer peripheral surface of a tubular inner layer 5. It should be noted that the hose for gasohol fuel of the third embodiment is not limited to one having the three-layer structure shown in FIG. 2 but may be any hose as far as the alcohol-cut off layer 7 is disposed at the outer periphery of the tubular inner layer 5. Also, another layer may be formed on the outer periphery side of the alcohol-cut off layer 7.

The hose of the third embodiment is characterized in that the inner layer 5 is composed of a composition containing a fluororubber and the alcohol-cut off layer 7 is composed of a rubber composition containing butyl rubber, a hydrated hydrotalcite compound and a 1,8-diazabicyclo(5,4,0)undecene-7 salt (DBU salt).

As the material for the inner layer (rubber composition) that forms the inner layer 5, a fluororubber (FKM) is used.

Examples of the fluororubber (FKM) include a vinylidene fluoride-ethylene chloride trifluoride copolymer, a vinylidene fluoride-propylene hexafluoride copolymer, a vinylidene fluoride-propylene hexafluoride-ethylene tetrafluoride copolymer, an ethylene tetrafluoride-propylene copolymer, an ethylene tetrafluoride-perfluorovinyl ether copolymer, and a vinylidene fluoride-ethylene tetrafluoride-perfluoroalkylvinyl ether copolymer. These may be used alone or in combination of two or more. Among these, a vinylidene fluoride-propylene hexafluoride-ethylene tetrafluoride copolymer is preferable because of its low fuel permeability and the like.

It is typical that the fluororubber content is preferably not less than 50 percent by weight of the total of the material (rubber composition) for the inner layer. The material for the inner layer may be composed of fluororubber (FKM) alone.

To the above-describe material for the inner layer, carbon black, an antioxidant, a vulcanizing agent (cross-linking agent), a vulcanization accelerator (cross-linking accelerator), a vulcanization aid (cross-linking aid), a processing aid, a white filler, a plasticizer, a softener, an acid acceptor, a coloring agent, a scorch retarder, and other suitable additives may be added in addition to the fluororubber described above.

The same materials as those used for the hose of the first embodiment are also used here as the rubber composition that forms the intermediate layer 6 (material for the intermediate layer) and the rubber composition that forms the alcohol-cut off layer 7 (material for the alcohol-cut off layer).

The hose for gasohol fuel of the third embodiment can be formed as follows. First, a material for inner layer containing fluororubber, a rubber composition (material for the intermediate layer) containing NBR-PVC or NBR, and a rubber composition (material for the alcohol-cut off layer) containing butyl rubber, a hydrated hydrotalcite compound, and a 1,8-diazabicyclo(5,4,0)undecene-7 salt (DBU salt) are prepared separately. The rubber composition (material for the inner layer) is extrusion-molded to form the inner layer 5. Next, the rubber composition (material for the intermediate layer) and the rubber composition (the material for the alcohol-cut off layer) are respectively extrusion molded (tandem method) on the outer peripheral surface of the inner layer 5. The resulting product is cut into a predetermined length, inserted into a mandrel, and vulcanized (140° C. to 170° C.×10 to 60 minutes). After the vulcanization, the resulting product is pulled out from the mandrel. Thus made is a three-layer structure hose for gasohol fuel having the intermediate layer 6 and the alcohol-cut off layer 7 sequentially formed on the outer peripheral surface of the tubular inner layer 5 (refer to FIG. 2).

The method for making the hose for the gasohol fuel of the third embodiment is not limited to the method described above.

In the hose for gasohol fuel of the third embodiment, the thickness of the inner layer 5 is preferably in the range of 0.01 to 0.5 mm and more preferably in the range of 0.05 to 0.3 mm, the thickness of the intermediate layer 6 is preferably in the range of 0.2 to 4 mm and more preferably in the range of 0.5 to 3 mm, and the thickness of the alcohol-cut off layer 7 is preferably in the range of 0.2 to 4 mm and more preferably in the range of 0.5 to 3 mm. Also, the hose inner diameter is preferably in the range of 2 to 50 mm and more preferably in the range of 5 to 40 mm.

The hose for gasohol fuel of the third embodiment is not limited to a three-layer structure as shown in FIG. 2. For example, the hose may have a two-layer structure in which the alcohol-cut off layer 7 is directly formed on the outer peripheral surface of the inner layer 5. Also, another layer may be formed on the outer peripheral side of the alcohol-cut off layer 7.

[Fourth Embodiment]

Figure 3:
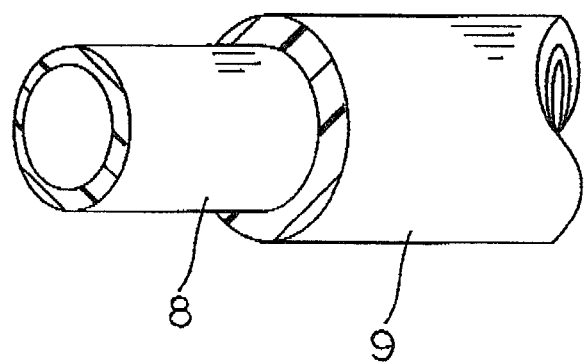
FIG. 3 is a schematic diagram showing an example of a hose for gasohol fuel according to the fourth embodiment of the present invention.

An example of the hose for gasohol fuel of the fourth embodiment according to the present invention is a hose having a two-layer structure shown in FIG. 3, in which an alcohol-cut off layer (outer layer) 9 is formed on the outer peripheral surface of a tubular inner layer 8. It should be noted that the hose for gasohol fuel of the fourth embodiment is not limited to one having the two-layer structure shown in FIG. 3, but may be any hose as far as the alcohol-cut off layer 9 is formed on the outer peripheral surface of the tubular inner layer 8. For example, another layer may be formed on the outer peripheral side of the alcohol-cut off layer 9.

The hose of the fourth embodiment is characterized in that the inner layer 8 is composed of a composition containing acrylonitrile-butadiene rubber or a blend rubber of acrylonitrile-butadiene rubber and polyvinyl chloride and that the alcohol-cut off layer 9 is composed of a rubber composition containing butyl rubber, a hydrated hydrotalcite compound, and a 1,8-diazabicyclo(5,4,0)undecene-7 salt (DBU salt).

As the material for the inner layer (rubber composition) that forms the inner layer 8, a particular rubber component composed of acrylonitrile-butadiene rubber (NBR) alone or a blend rubber (NBR-PVC) of acrylonitrile-butadiene rubber (NBR) and polyvinyl chloride (PVC) is used.

The content of the particular rubber component (NBR-PVC or NBR alone) is typically not less than 40 percent by weight of the total of the material (rubber composition) for the inner layer.

Examples of NBR include those having a medium-high AN content, a high AN content and an ultrahigh AN content. From the standpoint of resistance to fuel oil, NBR having an AN content in the range of 25 to 60 percent is preferred, and NBR having an AN content in the range of 30 to 55 percent is more preferred. NBR having an ultrahigh AN content is advantageous in that resistance to gasoline permeation is improved and thus resistance to gasoline and resistance to ozone are improved. Although NBR having a medium-high An content is slightly inferior to the NBR having an ultrahigh An content, it is advantageous in that resistance to gasoline permeation is improved.

The blend ratio (weight ratio) of NBR to PVC in the above-described NBR-PVC is preferably in the range of NBR/PVC=90/10 to 40/60, and more preferably in the range of NBR/PVC=80/20 to 50/50 from the standpoint of ozone property.

To the above-described material for the inner layer, carbon black, an antioxidant, a vulcanizing agent (cross-linking agent), a vulcanization accelerator (cross-linking accelerator), a vulcanization aid (cross-linking aid), a processing aid, a white filler, a plasticizer, a softener, an acid acceptor, a coloring agent, a scorch retarder, and other suitable additives may be added in addition to the rubber component described above.

The same material as the one used for the hose of the first embodiment is also used here as the rubber composition that forms the alcohol-cut off layer 9 (material for the alcohol-cut off layer).

The hose for gasohol fuel of the fourth embodiment can be formed as follows. First, a rubber composition (material for the inner layer) containing NBR-PVC or NBR and a rubber composition (material for the alcohol-cut off layer) containing butyl rubber, a hydrated hydrotalcite compound, and a 1,8-diazabicyclo(5,4,0)undecene-7 salt (DBU salt) are prepared separately. The rubber composition (material for the inner layer) is extrusion-molded to form the inner layer 8. The rubber composition (material for the alcohol-cut off layer) is then extrusion-molded on the outer peripheral surface of the inner layer 8. The resulting product is cut into a predetermined length, inserted into a mandrel, and vulcanized (140° C. to 170° C.×10 to 60 minutes). After the vulcanization, the resulting product is pulled out from the mandrel. Thus made is a two-layer structure hose for gasohol fuel having the alcohol-cut off layer 9 formed on the outer peripheral surface of the tubular inner layer 8 (refer to FIG. 3).

The method for making the hose for the gasohol fuel of the fourth embodiment is not limited to the method described above.

In the hose for gasohol fuel of the fourth embodiment, the thickness of the inner layer 8 is preferably in the range of 0.01 to 0.5 mm and more preferably in the range of 0.05 to 0.3 mm and the thickness of the alcohol-cut off layer 9 is preferably in the range of 0.2 to 4 mm and more preferably 0.5 to 3 mm. Also, the hose inner diameter is preferably in the range of 2 to 50 mm and more preferably in the range of 5 to 40 mm.

The hose for gasohol fuel of the fourth embodiment is not limited to the two-layer structure shown in FIG. 3. For example, another layer may be formed on the outer peripheral side of the alcohol-cut off layer 91

EXAMPLES

Next, Examples will be described in conjunction with Comparative Examples. However, the present invention is not limited by these Examples and Comparative Examples.

First, materials for forming the layers of the hose were prepared prior to making samples of Examples and Comparative Examples.

(Preparation of NBR Material and NBR-PVC Material)

The components shown in Table 1 below were blended at ratios described in the table. Each resulting mixture was kneaded with a Banbury mixer and rolls to prepare an NBR material and an NBR-PVC material.

TABLE 1

| | (parts by weight) | |
| --- | --- | --- |
| | NBR-PVC material 1 | NBR material 1 |
| Medium-high AN NBR-PVC | 100 | — |
| Ultrahigh AN NBR | — | 100 |
| Stearic acid | 1 | 1 |
| MgO | 10 | 10 |
| DBU salt | 2 | 1 |
| Carbon black | 30 | 45 |
| Zeolite | 10 | — |
| Talc | 20 | 25 |
| Basic silica | 15 | 20 |
| Ether ester plasticizer | 25 | 25 |
| Sulfur (vulcanizing agent) | 1 | 1 |
| Vulcanization accelerator (OBS) | 1 | 1 |

The materials shown in Table 1 were as follows:

[Medium-high AN NBR-PVC]
    Prototype (AN content=35 percent)

[Ultrahigh AN NBR]
    NIPOL DN003 available from Nippon Zeon Co., Ltd. (AN content 50 percent)

[Stearic acid]
    LUNAC S30 available from Kao Corporation

[MgO]
  KYOWA MAG #150 available from Kyowa Chemical Industry Co., Ltd.
[DBU salt]
  1,8-Diazabicyclo(5,4,0)undecene-7 salt (DBU salt) available from Daiso Co., Ltd.
[Carbon black]
  SEAST SO available from Tokai Carbon Co., Ltd.
[Zeolite]
  MIZUKALIZER DS available from Mizusawa Industrial Chemicals, Ltd.
[Talc]
  MISTRON PAPER TALC available from Nihon Mistron Co., Ltd.
[Basic silica]
  CARPREX 1120 available from DSL Japan
[Ether ester plasticizer]
  ADECASIZER RS107 available from Asahi Denka Kogyo Co.
[Sulfur (vulcanizing agent)]
  SULFAX T-10 available from Karuizawa Seirenjo Co.
[Vulcanization accelerator (OBS)]
  NOCCELER MSA available from Ouchi Shinko Chemical Industrial (Preparation of IIR Material)

The components shown in Table 2 below were blended at ratios described in the table. Each resulting mixture was kneaded with a Banbury mixer and rolls to prepare a IIR material.

TABLE 2

|  | (parts by weight) IIR material | |
| --- | --- | --- |
|  | 1 | 2 |
| Regular IIR | 25 | 75 |
| Halogenated IIR | 75 | 25 |
| Stearic acid | 1 | 1 |
| Carbon black | 50 | 50 |
| Naphthene oil | 5 | 5 |
| DBU naphthoate | 2 | 2 |
| Hydrated hydrotalcite compound | 5 | 5 |
| Cross-linking agent (SANCELER 22C) | 1 | 1 |
| Vulcanizing agent (SULFAX T-10) | 0.15 | 0.15 |
| Cross-linking aid (NOCTIZER SS) | 0.5 | 0.5 |

The materials shown in Table 2 were as follows:
[Regular IIR]
  BUTYL 365 available from JSR Corporation
[Halogenated IIR (Cl-IIR)]
  BUTYL HT1066 available from JSR Corporation
[Stearic Acid]
  LUNAC S30 available from Kao Corporation
[Carbon black]
  SEAST SO available from Tokai Carbon Co., Ltd.
[Naphthene oil]
  DIANA PROCESS NM-300 available from Idemitsu Kosan Co., Ltd.
[DBU naphthoate]
  DA-500 available from Daiso Co., Ltd.
[Hydrated hydrotalcite compound]
  DHT-4A available from Kyowa Chemical Industry Co., Ltd.
[Cross-linking agent]
  SANCELER 22C available from Sanshin Chemical Industry Co., Ltd.
[Sulfur (Vulcanizing Agent)]
  SULFAX T-10 available from Karuizawa Seirenjo Co.
[Cross-Linking Aid]
  NOCTIZER SS available from Ouchi Shinko Chemical Industrial Next, a hose was made using the materials for forming the layers of the hose described above.
[Making of the Hose of the First Embodiment]

Example 1A

A hose was made by using the materials for forming the layers as shown in Table 3 below. That is, NBR material 1 was prepared as the material for the innermost layer, a tetrafluoroethylene-hexafluoropropylene-vinylidene fluoride-perfluoroalkyl vinyl ether tetrapolymer (THV815G available from Dyneon) was prepared as the material for the inner layer, NBR-PVC material 1 was prepared as the material for the intermediate layer, and IIR material 1 was prepared as the material for the alcohol-cut off layer. First, the material for the innermost layer was extrusion-molded to form the innermost layer, and then the inner layer was formed by coating the outer peripheral surface of the innermost layer with the material for the inner layer. Next, the material for the intermediate layer and the material for the alcohol-cut off layer were respectively extrusion-molded on the outer peripheral surface of the inner layer. The resulting product was cut into a predetermined length (300 mm) and then inserted into a mandrel to conduct vulcanization (160° C.×30 minutes). After the vulcanization, the product was pulled out from the mandrel to form a four-layer structure hose (inner diameter: 24 mm) in which the inner layer, the intermediate layer, and the alcohol-cut off layer were sequentially formed on the outer peripheral surface of the tubular innermost layer.

Example 2A

A four-layer structure hose was made in the same manner as in Example 1A except that the material for the alcohol-cut off layer was changed as shown in Table 3 below.

Example 3A

A three-layer structure hose was made in the same manner as in Example 1A except that no intermediate layer was formed between the inner layer and the alcohol-cut off layer. In other words, the material for the innermost layer, the material for the inner layer, and the material for the alcohol-cut off layer as shown in Table 3 below were prepared separately. After the innermost layer was formed by extrusion-molding the material for the innermost layer, the material for the inner layer was coated on the outer peripheral surface of the innermost layer to form the inner layer. Subsequently, the material for the alcohol-cut off layer was extrusion-molded on the outer peripheral surface of the inner layer. The resulting product was cut into a predetermined length (300 mm) and then inserted into a mandrel to conduct vulcanization (160° C.×30 minutes). The resulting product was pulled out from the mandrel after the vulcanization to prepare a three-layer structure hose (inner diameter: 24 mm) having the inner layer and the alcohol-cut off layer sequentially formed on the outer peripheral surface of the tubular innermost layer.

Example 4A and Comparative Example 1A

A three-layer structure hose was each made in the same manner as in Example 3A except that the material for the alcohol-cut off layer was changed as shown in Table 3 below.

TABLE 3

| | Example | | | | Comparative Example |
|---|---|---|---|---|---|
| | 1A | 2A | 3A | 4A | 1A |
| Innermost layer | NBR material 1 | NBR material 1 | NBR material 1 | NBR material 1 | NBR material 1 |
| Thickness (mm) | 2 | 2 | 2 | 2 | 2 |
| Inner layer | * | * | * | * | * |
| Thickness (mm) | 0.1 | 0.1 | 0.1 | 0.1 | 0.1 |
| Intermediate layer | NBR-PVC material 1 | NBR-PVC material 1 | | | |
| Thickness (mm) | 0.5 | 0.5 | — | — | — |
| Alcohol-cut off layer | IIR material 1 | IIR material 2 | IIR material 1 | IIR material 2 | NBR-PVC material 1 |
| Thickness (mm) | 1.5 | 1.5 | 2.0 | 2.0 | 2.0 |
| Amount of permeation (mg) | 2.3 | 2.3 | 2.8 | 2.8 | 4.2 |
| Interlayer adhesive strength (N/cm) | 18 | 17 | 22 | 20 | 20 |

*: Tetrafluoroethylene-hexafluoropropylene-vinylidene fluoride-perfluoroalkyl vinyl ether tetrapolymer (THV815G available from Dyneon)

Samples of Examples and Comparative Examples thus obtained were used to evaluate various characteristics according to the standards described below. The results are also shown in Table 3 above.

[Amount of Permeation]

A metal pipe with rounded edges having an outer diameter of 25.4 mm (bulged portions having a maximum outer diameter of 27.4 mm were formed at two positions) was press-fitted into each of the two ends of each hose. An airtight stopper was press-fitted into one of the metal pipes, and a test solution (fuel C+ethanol 10 vol. %) was supplied through the other metal pipe to the inside of each hose. Subsequently, a screw-type airtight stopper was screw-fitted into the other metal pipe to encapsulate the test solution in each hose. Then, the hose was retained at 40° C. for 3000 hours. The amount of permeated hydrocarbon (HC) was measured for three days by the CARB SHED procedure using a DBL pattern. The amount of permeation of hydrocarbon (HC) observed on one day when the maximum value was measured was established as the amount of permeation.

[Interlayer Adhesive Strength]

A test piece having a width of 25.4 mm was cut out from each hose, and the outer layer of the test piece was peeled at a rate of 50 mm/min using a tensile tester (Japanese Industrial Standards (JIS) B 7721) to measure the interlayer adhesive strength (N/cm) during the peeling.

The results in Table 3 showed that in the samples of Examples having the alcohol-cut off layer containing butyl rubber, the amount of permeation of alcohol-blended gasoline was small and the resistance to alcohol fuel permeation was high. Moreover, the samples of Examples had high adhesive strength since each of the samples included the alcohol-cut off layer composed of either one of IIR materials 1 or 2 containing the DBU salt and the hydrated hydrotalcite compound.

In contrast, the sample of Comparative Example 1A did not include an alcohol-cut off layer containing butyl rubber, therefore the amount of permeation of the alcohol-blended gasoline was large and the resistance to permeation of alcohol fuel was low.

[Making of the Hose of the Second Embodiment]

Example 1B

A hose was made by using materials for forming the layers shown in Table 4 below. That is, NBR material 1 was prepared as the material for the innermost layer, polyamide 11 (RILSAN PA11 available from ELF ATOCHEM) was prepared as the material for the inner layer, NBR-PVC material 1 was prepared as the material for the intermediate layer, and IIR material 1 was prepared as the material for the alcohol-cut off layer. First, the innermost layer was formed by extrusion-molding the material for the innermost layer, and then the inner layer was formed by coating the outer peripheral surface of the innermost layer with the material for the inner layer. Next, the material for the intermediate layer was extrusion-molded on the outer peripheral surface of the inner layer and the material for the alcohol-cut off layer was extrusion-molded on the outer peripheral surface of the intermediate layer. The resulting product was cut into a predetermined length (300 mm) and then inserted into a mandrel to conduct vulcanization (160° C.×30 minutes). After the vulcanization, the product was pulled out from the mandrel to form a four-layer structure hose (inner diameter: 24 mm) in which the inner layer, the intermediate layer and the alcohol-cut off layer were sequentially formed on the outer peripheral surface of the tubular innermost layer.

Example 2B

A four-layer structure hose was made in the same manner as in Example 1B except that the alcohol-cut off layer was changed as shown in Table 4 below.

Example 3B

A three-layer hose was made in the same manner as in Example 1B except that no intermediate layer was formed between the inner layer and the alcohol-cut off layer. That is, the material for the innermost layer, the material for the inner layer and the material for the alcohol-cut off layer, as shown in Table 4 below, were prepared separately. After the innermost layer was formed by extrusion-molding the material for the innermost layer, the material for the inner layer was coated on the outer peripheral surface of the innermost layer to form the inner layer. Subsequently, the material for the alcohol-cut off layer was extrusion-molded on the outer peripheral surface of the inner layer. The resulting product was cut into a predetermined length (300 nm) and then inserted into a mandrel to conduct vulcanization (160° C.×30 minutes). The resulting product was pulled out from the mandrel after the vulcanization to prepare a three-layer structure hose (inner diameter: 24 mm) having the inner layer and the alcohol-cut off layer sequentially formed on the outer peripheral surface of the tubular innermost layer.

Example 4B and Comparative Example 1B

A three-layer structure hose was made in the same manner as in Example 3B except that the material for the alcohol-cut off layer was changed as shown in Table 4 below.

TABLE 4

|  | Example | | | | Comparative Example |
|---|---|---|---|---|---|
|  | 1B | 2B | 3B | 4B | 1B |
| Innermost layer | NBR material 1 | NBR material 1 | NBR material 1 | NBR material 1 | NBR material 1 |
| Thickness (mm) | 1 | 1 | 1 | 1 | 1 |
| Inner layer | PA11 | PA11 | PA11 | PA11 | PA11 |
| Thickness (mm) | 0.1 | 0.1 | 0.1 | 0.1 | 0.1 |
| Intermediate layer | NBR-PVC material 1 | NBR-PVC material 1 | — | — | — |
| Thickness (mm) | 0.5 | 0.5 | — | — | — |
| Alcohol-cut off layer | IIR material 1 | IIR material 2 | IIR material 1 | IIR material 2 | NBR-PVC material 1 |
| Thickness (mm) | 1.5 | 1.5 | 2.0 | 2.0 | 2.0 |
| Amount of permeation (mg) | 62.1 | 62.2 | 59.7 | 58 | 1250.4 |
| Interlayer adhesive strength (N/cm) | 18 | 17 | 21 | 20 | 20 |

*PA11: RILSAN PA11 available from ARKEMA

Samples of Examples and Comparative Examples obtained as such were used to evaluate the amount of permeation and the interlayer adhesive strength according to the standards described above. The results are also shown in Table 4.

The results in Table 4 showed that in the samples of Examples which included the alcohol-cut off layer containing butyl rubber, the amount of permeation of alcohol-blended gasoline was small and the resistance to alcohol fuel permeation was high. Moreover, the samples of Examples had high adhesive strength since the alcohol-cut off layers also contained the IIR material 1 or 2 each containing the DBU salt and the hydrated hydrotalcite compound.

In contrast, in the sample of Comparative Example 1B which did not include an alcohol-cut off layer containing butyl rubber, the amount of permeation of the alcohol-blended gasoline was large and the resistance to permeation of alcohol fuel was low.

[Making of the Hose of the Third Embodiment]

Example 1C

[Preparation of Fluororubber Material (Material for the Inner Layer)]

One hundred parts of fluororubber (FKM) (DAI-EL G555 available from Daikin Industries, Ltd., Co.), 10 parts of carbon black (SEAST SO available from Tokai Carbon Co., Ltd.), 3 parts of MgO (Kyowa Mag #150 available from Kyowa Chemical Industry Co., Ltd.), and 6 parts of CaO (CAL-Z available from Ohmi Kagaku Co., Ltd.) were kneaded with a Banbury mixer and rolls to prepare a fluororubber material (material for the inner layer).

(Making of Hose)

A hose was made using the materials for forming the layers shown in Table 5 below. That is, NBR-PVC material 1 was prepared as the material for the intermediate layer and IIR material 1 was prepared as the material for the alcohol-cut off layer. First, the material for the inner layer was extrusion-molded to form the inner layer. Next, the material for the intermediate layer and the material for the alcohol-cut off layer were respectively extrusion-molded on the outer peripheral surface of the inner layer. The resulting product was then cut to a predetermined length (300 mm) and inserted to a mandrel to conduct vulcanization (160° C.×30 minutes). After the vulcanization, the product was pulled out from the mandrel to form a three-layer structure hose (inner diameter: 24 mm) in which the intermediate layer and the alcohol-cut off layer were sequentially formed on the outer peripheral surface of the tubular inner layer.

Example 2C

A three-layer structure hose was made in the same manner as in Example 1C except that the alcohol-cut off layer was changed as shown in Table 5 below.

Example 3C

A two-layer structure hose was made in the same manner as in Example 1C except that no intermediate layer was formed between the inner layer and the alcohol-cut off layer. In other words, the material for the inner layer and the material for the alcohol-cut off layer each shown in Table 5 below were prepared separately. Then the inner layer was formed by extrusion-molding the material for the inner layer, and the material for the alcohol-cut off layer was extrusion-molded on the outer peripheral surface of the inner layer. The resulting product was cut into a predetermined length (300 mm) and then inserted into a mandrel to conduct vulcanization (160° C.×30 minutes). The resulting product was pulled out from the mandrel after the vulcanization to prepare a two-layer structure hose (inner diameter: 24 mm) having the alcohol-cut off layer formed on the outer peripheral surface of the tubular inner layer.

Example 4C and Comparative Example 1C

A two-layer structure hose was made in the same manner as in Example 3C except that the material for the alcohol-cut off layer was changed as shown in Table 5 below.

TABLE 5

|  | Example | | | | Comparative Example |
|---|---|---|---|---|---|
|  | 1C | 2C | 3C | 4C | 1C |
| Inner layer | Fluoro-rubber material | Fluoro-rubber material | Fluoro-rubber material | Fluoro-rubber material | Fluoro-rubber material |
| Thickness (mm) | 1 | 1 | 1 | 1 | 1 |
| Intermediate layer | NBR-PVC material 1 | NBR-PVC material 1 | — | — | — |
| Thickness (mm) | 0.5 | 0.5 | — | — | — |
| Alcohol-cut off layer | IIR material 1 | IIR material 2 | IIR material 1 | IIR material 2 | NBR-PVC material 1 |
| Thickness (mm) | 1.5 | 1.5 | 2.0 | 2.0 | 2.0 |
| Amount of permeation (mg) | 39 | 38.2 | 35 | 36 | 135.5 |
| Interlayer adhesive strength (N/cm) | 18 | 17 | 21 | 20 | 20 |

Samples of Examples and Comparative Examples thus obtained were used to evaluate the amount of permeation and the interlayer adhesive strength according to the standards described above. The results are also shown in Table 5.

The results in Table 5 showed that in the samples of Examples which included the alcohol-cut off layer containing butyl rubber, the amount of permeation of alcohol-blended gasoline was small and the resistance to alcohol fuel permeation was high. Moreover, the samples of Examples had high adhesive strength since each of the samples had the alcohol-cut off layer containing either one of the IIR materials 1 and 2 respectively containing the DBU salt and the hydrated hydrotalcite compound.

In contrast, in the sample of Comparative Example 1C which did not include an alcohol-cut off layer containing butyl rubber, the amount of permeation of the alcohol-blended gasoline was large and the resistance to permeation of alcohol fuel was low.

[Making of the Hose of the Fourth Embodiment]

Example 1D

A hose was made by using materials for forming the layers shown in Table 6 below. That is, NBR-PVC material 1 was prepared as the material for the inner layer and IIR material 1 was prepared as the material for the alcohol-cut off layer. First, the inner layer was formed by extrusion-molding the material for the inner layer. Then the material for the alcohol-cut off layer was extrusion-molded on the outer peripheral surface of the inner layer. The resulting product was cut into a predetermined length (300 mm) and then inserted into a mandrel to conduct vulcanization (160° C.×30 minutes). After the vulcanization, the product was pulled out from the mandrel to form a two-layer structure hose (inner diameter: 24 mm) in which the alcohol-cut off layer was formed on the outer peripheral surface of the tubular inner layer.

Examples 2D and 3D

A two-layer structure hose was made in the same manner as in Example 1D except that the material for the alcohol-cut off layer was changed in Example 2D and both the material for the inner layer and the material for the alcohol-cut off layer were changed in Example 3D, as shown in Table 6 below.

Comparative Example 1D

A single-layer structure hose (inner diameter; 24 mm) was made by extrusion-molding the material for the inner layer as shown in Table 6 below.

TABLE 6

|  | Example | | | Comparative Example |
| --- | --- | --- | --- | --- |
|  | 1D | 2D | 3D | 1D |
| Inner layer | NBR-PVC material 1 | NBR-PVC material 1 | NBR material 1 | NBR-PVC material 1 |
| Thickness (mm) | 2.0 | 2.0 | 3.0 | 4.0 |
| Alcohol-cut off layer | IIR material 1 | IIR material 2 | IIR material 2 | — |
| Thickness (mm) | 2.0 | 2.0 | 2.0 | — |
| Amount of permeation (mg) | 994.1 | 995.2 | 996.2 | 1577.8 |
| Interlayer adhesive strength (N/cm) | 18 | 17 | 19 | — |

Samples of Examples and Comparative Examples thus obtained were used to evaluate the amount of permeation and the interlayer adhesive strength according to the standards described above. The results are also shown in Table 6.

The results in Table 6 showed that in the samples of Examples which included the alcohol-cut off layer containing butyl rubber, the amount of permeation of alcohol-blended gasoline was small and the resistance to alcohol fuel permeation was high. Moreover, the samples of Examples had high adhesive strength since the alcohol-cut off layers also contained the IIR material 1 or 2 each containing the DBU salt and the hydrated hydrotalcite compound.

In contrast, in the sample of Comparative Example 1D which did not include an alcohol-cut off layer containing butyl rubber, the amount of permeation of the alcohol-blended gasoline was large and the resistance to permeation of alcohol fuel was low.

The above-described hose for gasohol fuel according to the present invention is usable for pipes for transporting gasoline mixed with an alcohol such as methanol or ethanol (gasohol).

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A hose for gasohol fuel comprising:
a tubular inner layer, and
an alcohol-cut off layer formed at an outer periphery of the inner layer,
wherein the inner layer includes a composition containing at least one selected from the group consisting of (A), (B), and (D) below, and the alcohol-cut off layer includes a rubber composition containing a butyl rubber, a hydrated hydrotalcite compound, and a 1,8-diazabicyclo(5,4,0)undecene-7 salt (DBU salt):
(A) a tetrafluoroethylene-hexafluoropropylene-vinylidene fluoride-perfluoroalkyl vinyl ether tetrapolymer;
(B) a polyamide resin; and
(D) one of an acrylonitrile-butadiene rubber and a blend material of an acrylonitrile-butadiene rubber and polyvinyl chloride.

2. The hose for gasohol fuel according to claim 1, wherein the butyl rubber is at least one of a regular butyl rubber and a halogenated butyl rubber.

3. The hose for gasohol fuel according to claim 1, wherein an amount of the hydrated hydrotalcite compound relative to 100 parts by weight of the butyl rubber is in the range of 1 to 15 parts by weight.

4. The hose for gasohol fuel according to claim 1, wherein an amount of the DBU salt relative to 100 parts by weight of the butyl rubber is in the range of 0.1 to 3 parts by weight.

5. The hose for gasohol fuel according to claim 1, further comprising a layer including a rubber composition containing an acrylonitrile-butadiene rubber, the layer being disposed between the inner layer and the alcohol-cut off layer.

6. The hose for gasohol fuel according to claim 1, further comprising a layer including a rubber composition containing the acrylonitrile-butadiene rubber, the layer being disposed at the inner periphery of the inner layer.

7. The hose for gasohol fuel according to claim 5, wherein a rubber component in the rubber composition containing the acrylonitrile-butadiene rubber is one of a blend rubber of the acrylonitrile-butadiene rubber and polyvinyl chloride and the acrylonitrile-butadiene rubber alone.

8. The hose for gasohol fuel according to claim 6, wherein a rubber component in the rubber composition containing an acrylonitrile-butadiene rubber is one of a blend rubber of the acrylonitrile-butadiene rubber and polyvinyl chloride and the acrylonitrile-butadiene rubber alone.

9. The hose for gasohol fuel according to claim 1, wherein the polyamide resin is one of polyamide 6 and polyamide 11.

\* \* \* \* \*